April 7, 1931. C. H. ROTH 1,799,866
PHOTOGRAPHIC STUDIO SET
Filed April 9, 1930 2 Sheets-Sheet 1

INVENTOR
Charles H. Roth
BY
his ATTORNEY

April 7, 1931.  C. H. ROTH  1,799,866
PHOTOGRAPHIC STUDIO SET
Filed April 9, 1930   2 Sheets-Sheet 2
Fig. 3
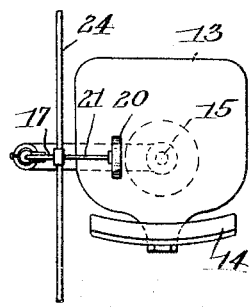
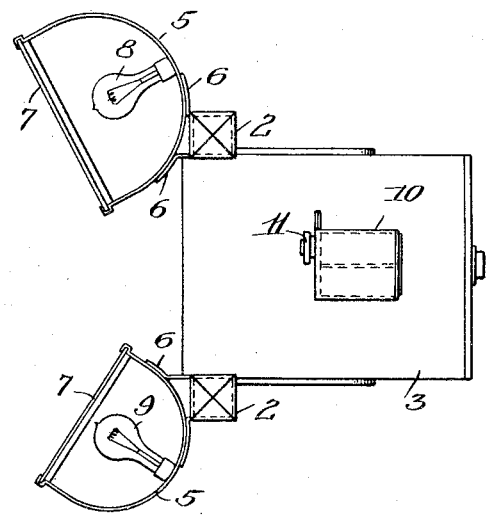
Fig. 4
Fig. 5
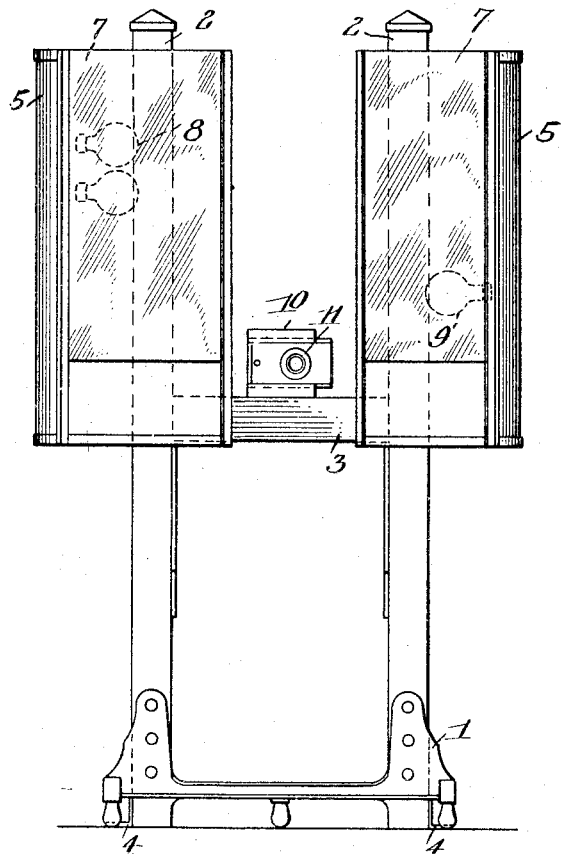
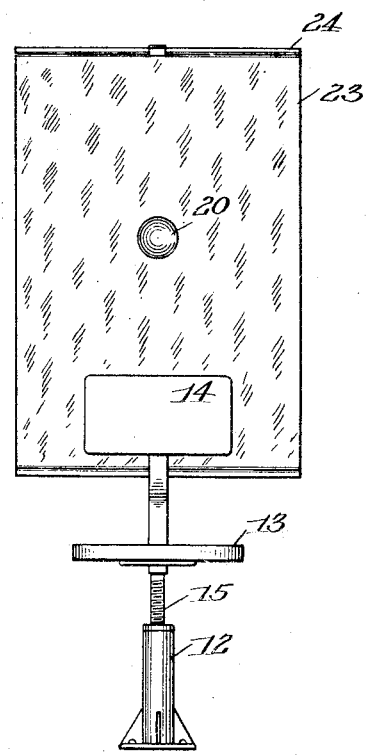
INVENTOR
Charles H. Roth
BY
his ATTORNEY Patented Apr. 7, 1931

1,799,866

UNITED STATES PATENT OFFICE

CHARLES H. ROTH, OF ROCHESTER, NEW YORK, ASSIGNOR TO THE FOLMER GRAFLEX CORPORATION, OF ROCHESTER, NEW YORK, A CORPORATION OF DELAWARE

PHOTOGRAPHIC STUDIO SET

Application filed April 9, 1930. Serial No. 442,951.

My present invention relates to photography and more particularly to studio sets, and it has for its object to provide an apparatus of this nature particularly adapted for taking photographs of criminals for police purposes. The improvements are particularly directed to features whereby the apparatus may be quickly adjusted to persons of different stature and both full face and profile views made in rapid succession without refocusing the camera itself but with the subject in perfect focus nevertheless.

To these and other ends, the invention resides in certain improvements and combinations of parts, all as will be hereinafter more fully described, the novel features being pointed out in the claims at the end of the specification.

In the drawings:

Fig. 3 is a top plan view with the seat in another position;

Fig. 4 is an elevation of the camera element looking into the lens, and

Fig. 5 is an elevation of the seat as viewed by the camera.

Similar reference numerals throughout the several views indicate the same parts.

Figure 1:
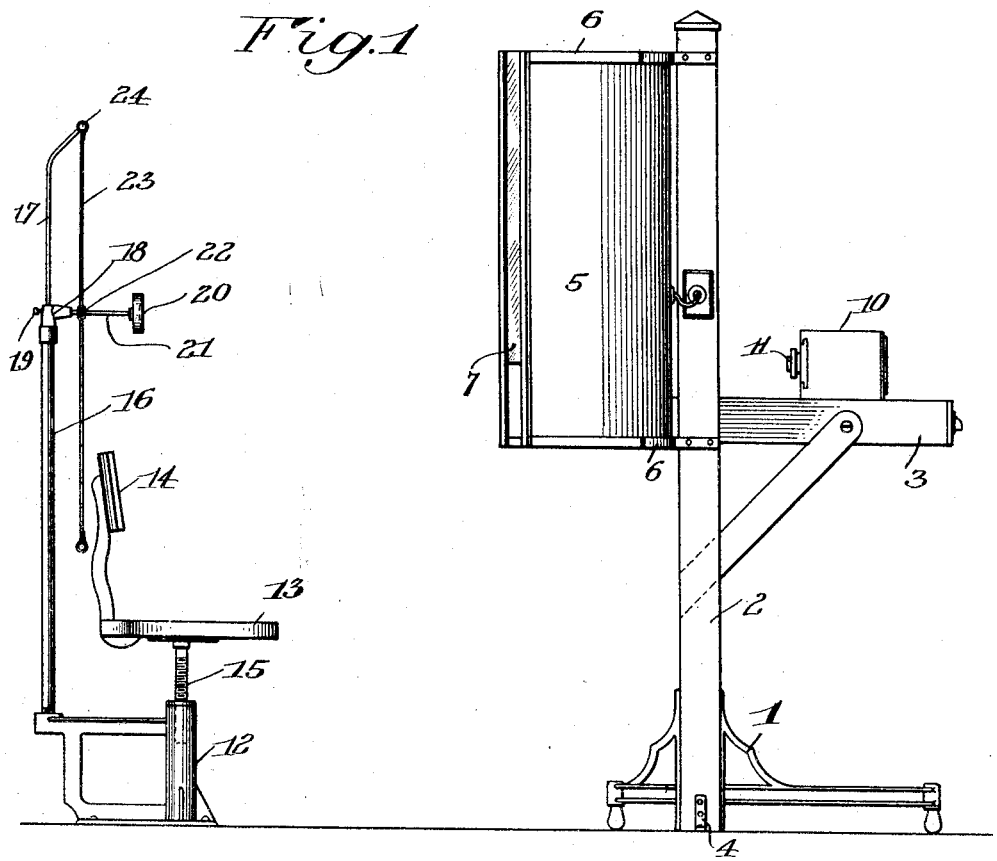
Fig. 1 is a side view of a studio set constructed in accordance with and illustrating one embodiment of my invention.
Figure 2:
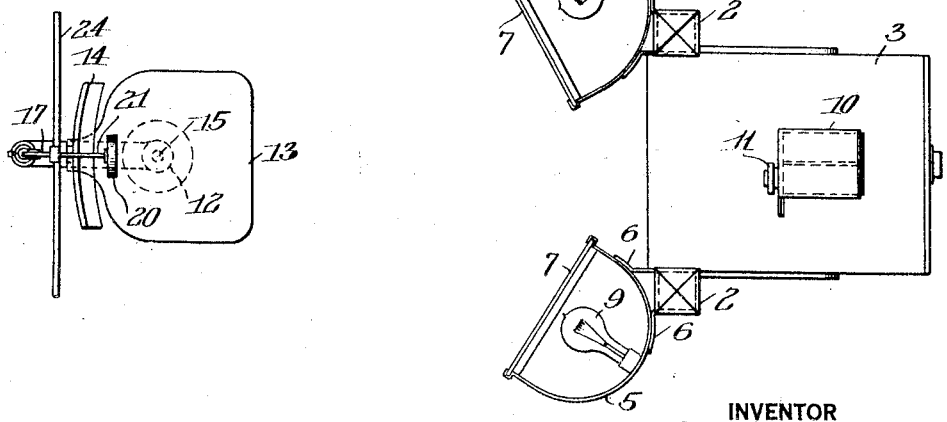
Fig. 2 is a top plan view thereof with the seat in one position.

Referring more particularly to the drawings, the camera element comprises a base 1, standards 2, and a table 3 supported by the standards and between them. The element has a fixed position being secured to the floor of the studio as at 4. Each standard carries an illuminating element consisting of a suitable reflector 5 secured thereto as by the bracket straps 6 and having a light diffusing element 7 at the front, as for instance a ground glass plate. These are faced inwardly toward each other and toward the objective focal point of the camera lens, as shown in Figs. 2 and 3, and one is preferably larger than the other to give a slight shadow contrast in the lighting effect. The reflectors are respectively provided with high and low lights at 8 and 9 for the same purpose.

Preferably fixed on the table 3 in rear of the reflectors so that the cone of light thereto passes between them is the preferably fixed focus camera 10 having a lens 11.

The seating element is placed a suitable distance in front of and in alinement with the camera lens generally, at least it is on the median line thereof. It consists in the present instance of a base element 12 secured to the floor and carrying a swivelled seat 13 with a back rest 14. The stem 15 of the chair is screwed into the base so that it may be raised and lowered, but on a quarter turn thereof, which is contemplated in the use herein described, it does not appreciably raise or lower. The center of the seat of the chair is an offset position or an eccentric position with respect to the stem and its point of attachment, so that as the subject sits erectly upon the seat the center of his body will be offset from the pivoting point and offset forwardly when he is facing the camera for a full face view.

In rear of the seat, there rises from the frame of the base 12 a tubular standard 16 carrying a supporting rod 17. An adjustable socket member 18 fixed by a set screw 19 supports the rod 17 on the top end of the standard and attachably secured to the socket member is a head rest 20, the stem 21 of which passes through a prepared opening 22 in a background curtain 23 which is hung from a cross rod 24 carried at the upper end of the rod 17.

The head rest 20 is also on the median line of the camera lens and directly above the seat and back rest. The seat, as aforesaid, may be adjusted toward and from it to properly accommodate different sized persons and with these elements properly adjusted to each other a front or full face view of the subject is first taken. The camera is focused relatively to the head rest so that its focal point will be not thereat but in the plane of the features of one whose head (of average size) rests against the head rest. This front view being taken, the subject is rotated in the chair a quarter revolution so that he faces to the side, as in Fig. 2, and his head again placed against the head rest for a profile view. The skull is deeper from front to rear than it is from side to side, and hence a focus on the face is not proper for the cheek and profile. But with my invention and due to the eccentric attachment of the chair to the swivelling or pivoting element, the turn to the side compensates for this and brings the subject again into focus. In general, the arrangement is such that the movement of the subject from front to side does not disturb the focus.

I claim as my invention:

1. In a photographic studio set for making identifying photographs, the combination with a camera stand and camera having a relatively fixed position, of a chair in the field of the camera lens comprising a pedestal and a seat swivelled thereon eccentrically, a standard fixed relatively to the seat, and a head rest on the standard.

2. In a photographic studio set for making identifying photographs, the combination with a camera stand and camera having a relatively fixed position, of a chair in the field of the camera lens comprising a pedestal, a seat swivelled thereon eccentrically and a back arranged to position the occupant centrally of the seat, a standard fixed relatively to the seat, and a head rest on the standard.

3. In a photographic studio set for making identifying photographs, the combination with a camera and a seat for the subject, of a standard in rear of the seat, a background curtain hung from the standard, and a head rest on the standard projecting through the curtain.

4. In a photographic studio set for making identifying photographs, the combination with a camera and a seat for the subject, of a standard in rear of the seat, a background curtain hung from the standard, and a head rest on the standard projecting through the curtain in the axis of the lens, the seat being adjustable relatively to the head rest.

CHARLES H. ROTH.